United States Patent
Andersen et al.

(10) Patent No.: US 12,467,432 B2
(45) Date of Patent: Nov. 11, 2025

(54) HANDLING A WIND TURBINE IN A SEVERE WEATHER CONDITION

(71) Applicant: Siemens Gamesa Renewable Energy A/S, Brande (DK)

(72) Inventors: Martin Folmer Andersen, Copenhagen (DK); Soeren Trabjerg Brun, Jelling (DK); Thomas Esbensen, Herning (DK); Carla Hagler, Vejle (DK); Muhammad Arsalan Khan, Herning (DK); Oscar Ramirez Requeson, Vallensbæk Strand (DK); Ryan A. Sievers, Lyons, CO (US); Henrik Stensgaard Toft, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/278,257

(22) PCT Filed: Feb. 21, 2022

(86) PCT No.: PCT/EP2022/054276
§ 371 (c)(1),
(2) Date: Aug. 22, 2023

(87) PCT Pub. No.: WO2022/184490
PCT Pub. Date: Sep. 9, 2022

(65) Prior Publication Data
US 2024/0125297 A1 Apr. 18, 2024

(30) Foreign Application Priority Data
Mar. 1, 2021 (EP) .................................... 21160009

(51) Int. Cl.
F03D 7/02 (2006.01)

(52) U.S. Cl.
CPC ...... *F03D 7/0268* (2013.01); *F05B 2260/821* (2013.01); *F05B 2270/1077* (2020.08); *F05B 2270/321* (2013.01); *F05B 2270/329* (2013.01)

(58) Field of Classification Search
CPC .......... F05B 2260/821; F05B 2270/321; F05B 2270/329
See application file for complete search history.

(56) References Cited

U.S. PATENT DOCUMENTS

| 2004/0105751 A1 | 6/2004 | Wobben |
| 2008/0084068 A1* | 4/2008 | Shibata ................. F03D 7/0268 290/55 |

(Continued)

FOREIGN PATENT DOCUMENTS

| CN | 102518557 A | 6/2012 |
| CN | 103987958 A | 8/2014 |

(Continued)

OTHER PUBLICATIONS

International Search Report & Written Opinion for PCT/EP2022/054276 issued on May 20, 2022.

*Primary Examiner* — Sean Gugger
(74) *Attorney, Agent, or Firm* — Schmeiser, Olsen & Watts LLP

(57) ABSTRACT

A method of handling a wind turbine is provided including a nacelle coupled via a yawing system to a tower for protection against high wind load, the method including: supplying a control signal to a yawing actuator of the yawing system, while the nacelle is in a first orientation; exerting, by the yawing actuator, a torque to the nacelle relative to the tower, thereby turning the nacelle to a second orientation being a downwind orientation.

15 Claims, 2 Drawing Sheets

(56) References Cited

U.S. PATENT DOCUMENTS

| | | |
|---|---|---|
| 2009/0047129 A1 | 2/2009 | Yoshida |
| 2011/0133455 A1* | 6/2011 | Altenschulte ........... F03D 7/042 290/44 |
| 2014/0234107 A1 | 8/2014 | Oh |
| 2019/0153999 A1* | 5/2019 | Nielsen ................. F03D 7/0204 |
| 2020/0102932 A1* | 4/2020 | Hovgaard ............... F03D 7/045 |

FOREIGN PATENT DOCUMENTS

| | | |
|---|---|---|
| CN | 108 240 303 A | 7/2018 |
| CN | 109 488 529 A | 3/2019 |
| EP | 1 339 985 B1 | 8/2006 |
| EP | 2 169 219 A2 | 3/2010 |
| EP | 1 429 025 B1 | 11/2013 |
| EP | 3 502 463 A1 | 6/2019 |
| JP | 2019 163734 A | 9/2019 |
| WO | 2021004788 A1 | 1/2021 |

\* cited by examiner

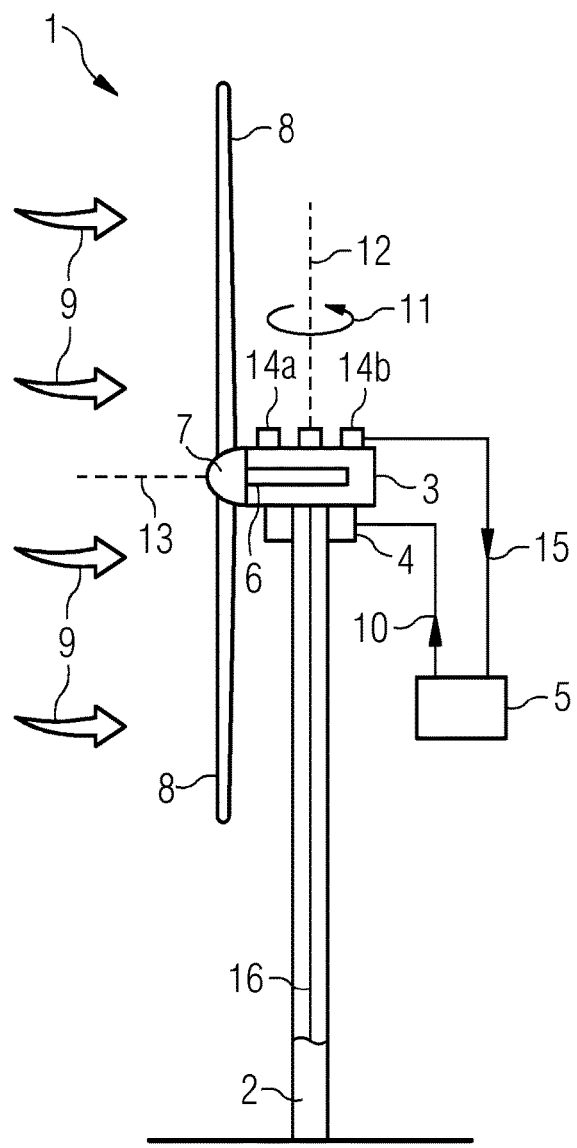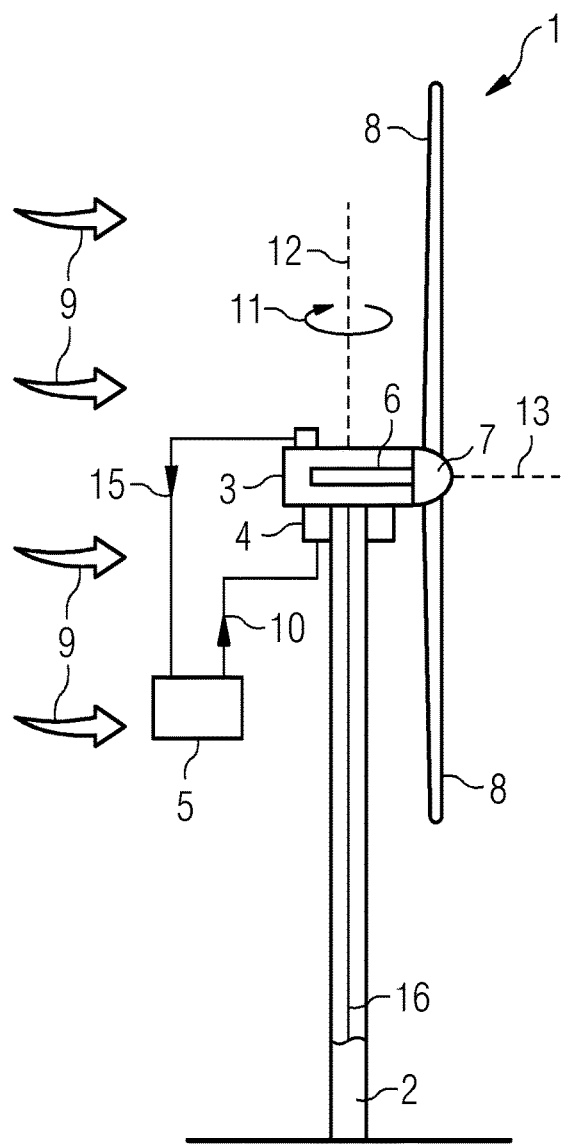

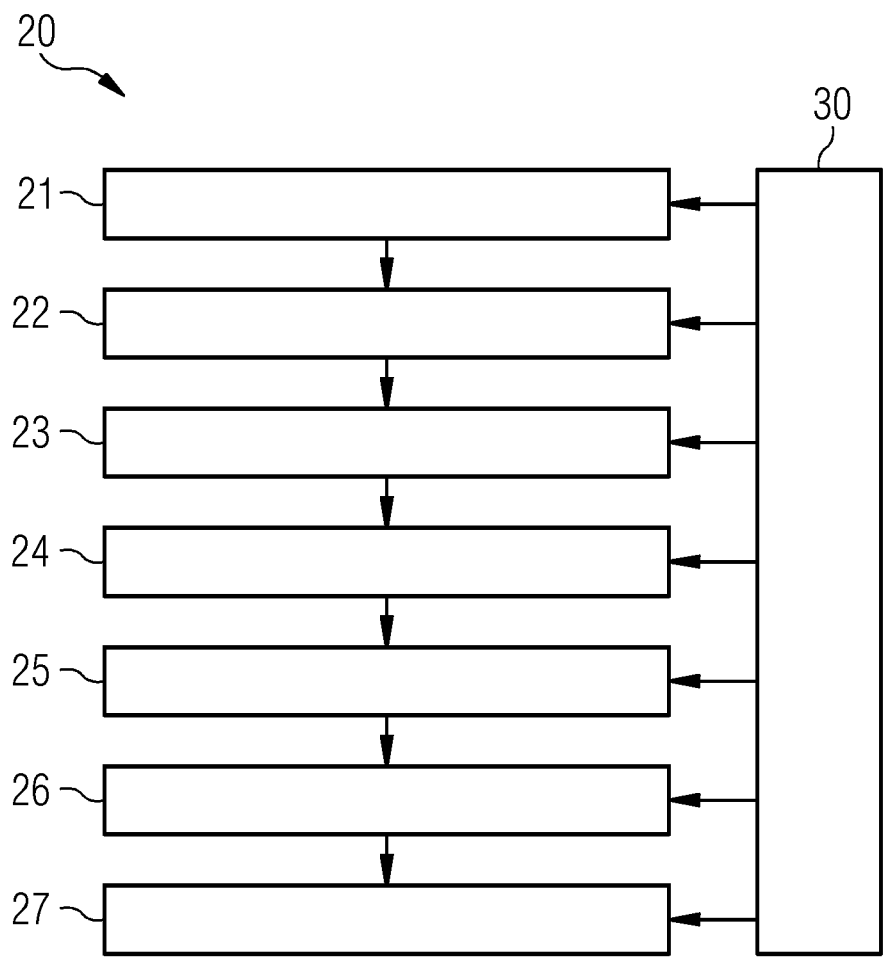

HANDLING A WIND TURBINE IN A SEVERE
WEATHER CONDITION

CROSS-REFERENCE TO RELATED APPLICATIONS

This application claims priority to PCT Application No. PCT/EP2022/054276, having a filing date of Feb. 21, 2022, which claims priority to European Application No. 21160009.3, having a filing date of Mar. 1, 2021, the entire contents both of which are hereby incorporated by reference.

FIELD OF TECHNOLOGY

The following relates to a method and to an arrangement of handling a wind turbine in respect of a high wind load, in particular during a high or a severe weather condition. Further, the following relates to a wind turbine configured to perform the method.

BACKGROUND

A wind turbine may be subjected to a high wind condition and may need to be prepared to handle such a situation. In particular, a wind turbine subjected to very extreme wind conditions like for example hurricanes, typhoons or tropical cyclones may need to be able to withstand the severe wind speeds and wind direction changes which might occur during these weather conditions.

EP 1 429 025 B1 discloses an upwind type of windmill and operating method.

EP 1 339 985 B1 discloses azimuth control of a wind energy turbine during a storm.

Conventional methods may not have handled extreme weather conditions, such as extreme wind conditions, in a manner to reliably protect components of the wind turbine from damage or in a satisfactory manner. Further problems with the conventional art may relate to high energy consumption or other disadvantages.

Thus, there may be a need for a method and a corresponding arrangement for handling a wind turbine during a high wind load situation, in particular during a storm, a hurricane, a typhoon or a tropical cyclone, wherein at least some of the aforementioned problems are reduced or even overcome.

SUMMARY

An aspect relates to a method of handling a wind turbine comprising a nacelle coupled via a yawing system to a tower, in particular for protection against high wind load, the method comprising: supplying a control signal to a yawing actuator of the yawing system, while the nacelle is in a first orientation; exerting, by the yawing actuator, a torque to the nacelle relative to the tower, thereby turning the nacelle to a second orientation being a downwind orientation.

In embodiments, the method may be implemented in software and/or hardware and may be performed by a module of a wind turbine controller.

In embodiments, the method may be performed "for protection against high wind load" as a rationale. However, protection against high wind load, may be but is not necessarily a condition for the method. In embodiments, the method may be triggered to yaw downwind e.g., when exceeding a (filtered) wind speed threshold and/or a delay has elapsed and/or a user command has been received, etc.

In embodiments, the method may be performed using the yawing actuator which rotatably couples the wind turbine tower with the nacelle such that the orientation of the nacelle is adjustable by actuating the yawing actuator. The yawing actuator may comprise one or more electrical motors for example and/or a hydraulic system.

Within the nacelle, a rotor may be rotatably supported, wherein the rotor may drive a generator to generate electrical energy upon rotation of the rotor. At the rotor plural rotor blades are connected.

The yawing system may be configured to rotate or turn or yaw the nacelle relative to the tower around a rotation axis which coincides substantially with a longitudinal axis of the wind turbine tower.

The high wind load may be due to a high wind velocity for example during a storm, a hurricane, a typhoon or a cyclone. The high wind load may evolve, if for example the wind velocity is higher than for example 50 m/s or 100 m/s. In embodiments, the method may be triggered when a wind speed (for example monitored by one or more wind speed sensors) exceeds above a wind speed threshold, which may be set depending on the application, depending on the structural properties of the wind turbine and in particular structural properties of the rotor blades. In embodiments, the method may be triggered or initiated manually or automatically.

The first orientation may relate to an orientation of the nacelle (relative to the tower) adopted during for example a normal operation, while the wind turbine produces electrical energy. The first orientation may for example be adopted during periods of wind speed being lower than the wind speed threshold beyond which the wind load would be too high for the wind turbine to be operated in a normal operation. For example, in the first orientation, the nacelle may be oriented such that wind impacting on the rotor blades cause the rotor to rotate.

In contrast, in the second orientation the wind turbine may not be oriented for producing energy. In the second orientation the rotor may rotate, but with a significantly lower rotational speed (e.g., between 0% and 50% of speed in the first orientation) than in the first position. The second orientation may be adopted in a shut-down state of the wind turbine, aimed to protect components of the wind turbine from damage.

The transition from the first orientation of the nacelle to the second orientation of the nacelle is (at least partly) effected by the action of the yawing actuator, in that the yawing actuator exerts the torque to the nacelle relative to the tower which leads to turning the nacelle (essentially around the longitudinal axis of the tower) to achieve the second orientation. An angle between the first orientation and the second orientation may be between 160° and 220°, in particular around 180°.

The yawing speed or turning speed (for example measured in degrees per second) may be constant during the transition from the first orientation to the second orientation or may assume different values. For example, for certain yawing ranges where especially high load is expected, the turning speed may be smaller than or different from the speed at other yawing ranges, where less load is expected. During yawing the nacelle from the first orientation to the second orientation, it is not excluded that some turning torque is also exerted by the impacting wind. However, the yawing actuator also applies an active yawing, i.e., applies a torque for actively turning the nacelle.

The "torque" exerted by the actuator may be set such the yaw is controlled in the desired direction, but "torque" exerted by the actuator may not necessarily be acting in that direction.

According to an embodiment of the present invention, in high enough winds, impact of wind may cause the yaw motors to generate power (rather than consume it). In order to maintain a controlled yaw (e.g., regarding yawing speed and/or yaw position), the yaw motor(s) (an example of an actuator) and/or yaw brake(s) may be used either actively or passively to counter the force of the wind, especially in order to slow down or otherwise control the yaw speed to minimize loading through certain sectors as described above.

The turning direction may be clockwise or anti-clockwise. However, the degree of twist of cables which run from the nacelle into the tower may be considered and may be minimized by appropriately choosing the turning direction.

The time for turning the nacelle from the first orientation to the second orientation may be in a range between 5 and 20 minutes.

When the yawing actuator is employed for actively turning or yawing the nacelle, the transition from the first orientation to the second orientation may be performed in a controlled and predictable manner and time. Thereby, components of the wind turbine may be protected from damage.

Furthermore, when the second orientation is a downwind orientation, the deteriorating or damaging effect of the wind impacting onto the wind turbine may be less, compared to the situation where the wind turbine or the nacelle is in an upwind orientation.

The downwind orientation of the nacelle may be an orientation basically opposite to an orientation of the nacelle which is adopted during normal operation behaviour for producing electric energy. In the downwind orientation the hub at which the plural rotor blades are mounted, may not face the wind but may be oriented in an opposite manner. The downwind orientation may also be referred to as Lee orientation of the nacelle, involving that the hub and also the rotor blades are in Lee or downwind oriented relative to the tower.

In contrast, in the first orientation which might be an upwind orientation, the hub including the rotor blades may be oriented in Luv or upwind relative to the tower.

It has been found that the loading on the wind turbine due to a high wind speed situation is mainly dependent on the wind speed and the turbine position relative to the wind. The yawing actuator may need to have sufficient capacity and electrical power available for tracking the wind direction during the extreme wind conditions in order to ensure structural integrity.

Embodiments of the present invention place the turbine at the downwind position/orientation during extreme wind conditions. Thereby, the requirements to the yawing capacity may be reduced compared to conventional systems, because the turbine needs to yaw with the wind and not against the wind, in case of wind direction changes. Furthermore, the electrical power consumption from the yawing system to perform the turning operation from the first orientation to the second orientation may be less than other conventional methods which do not adopt a downwind orientation of the nacelle in case of high wind load. Thus, embodiments of the present invention may allow also to perform the method when the wind turbine is disconnected from a utility grid. In this case, the required electrical energy may be taken from a power backup system which may be explained in detail below.

While the nacelle is in the first orientation, the wind turbine may still produce electric energy or may already be idling. Thus, for example blade pitch angles of the rotor blades may already be in a feathered position, i.e., in a position where the lifting force is minimal. In embodiments, the method, the rotor may substantially not be rotating or may be rotating only very slowly.

According to an embodiment of the present invention, in the downwind orientation the rotor blade hub at which plural rotor blades are mounted is opposite to facing the wind and an angle between the rotor axis and the wind direction is within a tolerance angle range, being in particular between 0° and 20°, wherein at a nacelle orientation of 180° a wind direction is parallel to the rotor axis and the rotor blade hub is opposite to facing the wind.

In the downwind orientation the rotor blades and the hub may be arranged downstream or downwind relative to the tower. In the downwind orientation deteriorating or damaging effect of the heavy wind may be less than in an upstream orientation for example.

According to an embodiment of the present invention, the first orientation is an upwind orientation; and/or active yaw control is performed when in first orientation and the second orientation.

In the upwind orientation the rotor blades may be upstream or upwind relative to the tower. Active yaw control may involve supplying control signals to the yawing actuator in order for the yawing actuator to exert a torque to the nacelle relative to the tower. Active yaw control is different from passively allowing the nacelle to turn due to for example (only) external influences, like wind impact.

According to embodiments of the present invention, also one or more brakes may be operated or controlled during the method. For example, the turning from the first orientation to the second orientation may be performed step-wise, while in one or more steps brakes may be activated to stop turning. Turning may for example be stopped while the speed of the wind is exceptionally high that even a turning of the nacelle should be avoided.

According to an embodiment of the present invention, in the upwind orientation a rotor blade hub at which plural rotor blades are mounted faces the wind and an angle between the rotor axis and the wind direction is within a tolerance angle range, being between 0° and 20°, in particular being between 0° and 10°, wherein at a nacelle orientation of 0° a wind direction is parallel to the rotor axis and the rotor blade hub faces the wind.

In the upwind orientation the rotor blades are upstream or upstream relative to the tower. The upwind orientation may be adopted for normal operation for producing electric energy. When in the upwind orientation, impacting wind may cause the rotor to rotate due to the lifting force acting on the rotor blades. In embodiments, the method allows adoption of a safe mode of operation during a high wind load situation or condition starting for example from a normal operation state of the wind turbine.

According to an embodiment of the present invention, the method further comprises commanding the yaw actuator to turn the nacelle by 180° starting from the first orientation to reach the second orientation, in particular without considering wind direction information.

In this embodiment, a wind speed direction sensor may at least initially not be required. The yaw actuator may merely be commanded to turn the nacelle by 180° relative to the starting orientation, for example the first orientation. Thereby, not necessarily the wind direction needs to be tracked. This embodiment may be advantageous, if either a reliable or accurate wind direction information is not available due to communication problems, or for example in a case where one or more wind direction sensors are temporarily blocked due to for example a shadowing effect of structures upwind of the wind direction sensors. During turning the nacelle starting from the first orientation however, the temporarily blocked wind direction sensor may be unblocked and a reliable wind direction signal may become available even before the 180° turn has been completed. When the wind direction information is again available, the method may involve consideration of the available wind direction information and turn the nacelle such that for example the nacelle orientation is 180° or in a tolerance angle range around 180° in the second orientation.

Thus, embodiments allow definition of the second orientation with respect to the actual wind direction or definition of the second orientation with respect to the first orientation. Furthermore, a combination may be applied in that the definition of the second orientation may be switched during the turning depending on the availability of for example wind direction information.

According to an embodiment of the present invention, the method further comprises at least one of: monitoring a wind direction while turning the nacelle and/or while in the second orientation and/or while in the first orientation; filtering the monitored wind direction, wherein a filter time constant depends on a wind speed.

Furthermore, also the wind speed may be monitored and may also be considered in the embodiments of the present invention for controlling the method. The wind direction may be monitored or measured by one or more wind direction sensors (which may also be configured to measure wind speed and/or turbulence). Monitoring the wind direction may enable to more accurately transition the nacelle to a position which reliably protects wind turbine components from damage. The wind direction information may be considered by the method while turning the nacelle to the second orientation. In particular, the second orientation may be defined relative to the monitored wind direction. In this sense, the second orientation may be considered to be a target orientation for the high wind load situation and the second orientation may be dynamically defined, depending on potentially changing wind direction.

Turning the nacelle may be performed depending on the monitored wind direction. Thereby, either unfiltered or filtered wind direction may be considered. Filtering the wind direction may provide a smoothing and may therefore improve the method.

According to an embodiment of the present invention, at least a first wind direction sensor and a second wind direction sensor mounted at different locations at the wind turbine are used, whose measurement signals and/or state information are considered in combination and/or in a weighted manner for providing the wind direction information.

The first and second wind direction sensors may also be configured to measure wind speed and/or turbulence. The sensors may for example be mounted on top of the nacelle or at least at a top portion. However, further structures or in a particular a cooling portion may also be mounted on top of the nacelle. Therefore, for particular yawing orientations and wind directions one of the wind direction sensors or both may be blocked, i.e., may be arranged in the shadow of a blocking structure upwind the sensors. In embodiments, the method may detect that a wind direction sensor is blocked. In this case, measurement data from the other wind direction sensor, if present and not also blocked may be primarily utilized or weighted with a higher magnitude for providing the wind direction information. The information provided by the wind direction sensors may be processed similar as was described in the document WO 2021/004788 A1. Thereby, reliability of the method may be improved.

According to an embodiment of the present invention the turbine may have only a single wind sensor and/or the turbine relies on a wind sensor mounted elsewhere (e.g., metmast or neighboring turbine).

According to an embodiment of the present invention, the method further comprises when the second orientation is reached and/or while turning the nacelle (and wind direction is monitored/available): supplying control signals to the yaw actuator to maintain nacelle orientation in a tolerance angle range around 180° when the monitored wind direction changes.

According to this embodiment, active control of the yawing is continued, taking into account the actual measured or monitored wind direction. For example, an error signal may be supplied to a controller which may derive based on the error signal an actuator signal such that upon actuating the actuator the error signal decreases. The error signal may for example be a difference between a target nacelle orientation (for example at 180°) and an actual orientation of the nacelle (relative to wind direction). When the actual orientation of the nacelle deviates more than a specified tolerance from the target orientation, the actuator may be commanded to apply a torque to diminish the deviation between target orientation and actual orientation. Thereby conventionally available control methodology may be applied.

According to an embodiment of the present invention, the method further comprises if nacelle orientation is outside the tolerance angle range: controlling the yaw actuator to exert a torque on the nacelle to turn it such that the nacelle orientation is readjusted to be within tolerance angle range; stopping exerting the torque when a predetermined stop orientation within the tolerance angle range is reached.

The tolerance angle range may for example have a width of 5°, 10° or 20° depending on the application.

According to an embodiment of the present invention, turning the nacelle starting from the first orientation is in a turning direction to cause least cable twist when the second orientation is reached.

For example, a power cable connected within the nacelle to a converter or to the generator may run down from the nacelle into the wind turbine tower. Due to considerable stiffness of this power cable, twisting the cable may only be possible within the particular twisting range. In embodiments, the method may involve to also monitor the twisting or to determine the twisting depending on the adjusted yaw angle. In embodiments, the method may also involve monitoring the sense of the twisting, i.e., in the clockwise or the anti-clockwise direction of the cable. The twisting state may be monitored or stored in an appropriate storage. Then, depending on a considered target orientation in the second orientation, it may be determined or predicted, whether clockwise turning or anti-clockwise turning will lead to less twist. The turning direction which leads to the least twist in the second orientation may be chosen as the actual turning direction for transitioning the nacelle from the first orientation to the second orientation.

According to an embodiment of the present invention, the method further comprises exerting, by the yawing actuator, a torque to the nacelle relative to the tower, thereby turning the nacelle from the second orientation to a third orientation being an upwind orientation, wherein the third orientation is reached when the nacelle is turned by 180° starting from the second orientation and/or when the nacelle orientation is in a tolerance angle range around 0°.

When the windspeed has reduced (e.g., to the level where power may be produced) yawing to the third orientation may be delayed in order to avoid yawing upwind during the eye of the storm or during a temporary lull in the storm.

The delay may be implemented by various methods (e.g., using a multirate filter with a decreasing time constant, or windspeed below threshold for a specified time period).

According to an embodiment of the present invention deactivation of the downwind configuration (or second orientation) and/or adopting the third orientation may be performed or triggered by:

Immediately based on (e.g., normally filtered) windspeed;
delayed after wind speed decreased, e.g., to avoid eye of storm;
on demand via manual deactivation.

In the third orientation, the wind turbine may resume normal operation for producing electric energy, for example when the high wind load situation is over. The third orientation may be defined relative to the second orientation or relative to the wind direction, depending on the application and availability of wind direction information. Thereby flexibility may be enhanced. After being oriented into the third orientation, the wind turbine may resume normal operation or may be started such that the rotor starts rotating.

According to an embodiment of the present invention, the method further comprises turning the nacelle starting from the second orientation is in a turning direction to cause least cable twist when the third orientation is reached.

In particular, turning starting from the second orientation towards the third orientation may be in the same turning direction as or may be in a turning direction opposite to the turning direction from transitioning or turning the nacelle from the first orientation to the second orientation. In particular, when turning the nacelle from the first orientation to the second orientation, the turning direction and/or twist state may be memorized in a storage. Thereby excessive twisting of a power cable may be avoided.

According to an embodiment of the present invention, for actuating the yaw actuator electric energy is received from at least one of:

a utility grid;
a power backup system;
one or more batteries;
a combustion engine driven generator; and/or
wherein the method is performed or triggered or the nacelle is turned to the second orientation, when a high wind load, in particular wind speed above a speed threshold, is expected and/or predicted and/or detected.

In embodiments, the method may also be performed when the wind turbine is disconnected from the utility grid. For example, a Diesel generator may be utilized as a combustion engine. In embodiments, the method may be triggered for example based on weather forecast data or actually measured weather conditions or may be triggered manually.

It should be understood that features, individually or in any combination, disclosed, described or explained for a method of handling a wind turbine, may also, individually or in any combination, be applied to or provided for an arrangement for handling a wind turbine according to embodiments of the present invention and vice versa.

According to an embodiment of the present invention, it is provided an arrangement for handling a wind turbine comprising a nacelle coupled via a yawing system to a tower for protection against high wind load, the arrangement comprising: a control signal generator configured: to supply a control signal to a yawing actuator of the yawing system, while the nacelle is in a first orientation; to cause the yawing actuator to exert a torque to the nacelle relative to the tower, thereby turning the nacelle to a second orientation being a downwind orientation.

The arrangement may be a portion of a wind turbine controller. The yawing actuator may comprise an electric motor and/or a hydraulic system. The arrangement may be configured to carry out a method of handling a wind turbine according to an embodiment of the present invention.

According to an embodiment of the present invention it is provided a wind turbine, including: a tower; a nacelle on top of the tower coupled to the tower via a yawing system including a yawing actuator; and an arrangement according to the preceding embodiment communicatively coupled to the yawing actuator.

BRIEF DESCRIPTION

Some of the embodiments will be described in detail, with reference to the following figures, wherein like designations denote like members, wherein:

FIG. 1 schematically illustrates a wind turbine in a first operational state as achieved according to embodiments of the present invention;

FIG. 2 schematically illustrates a wind turbine in a second operational state as achieved according to embodiments of the present invention; and FIG. 3 illustrates a method diagram of a method according to an embodiment of the present invention.

DETAILED DESCRIPTION

The illustration in the drawings is in schematic form. The wind turbine 1 illustrated in FIG. 1 according to an embodiment of the present invention comprises a tower 2, a nacelle 3 on top of the tower, which is coupled to the tower 2 via a yawing system 4 including a yawing actuator. The wind turbine 1 further comprises an arrangement 5 (in nacelle 3) for handling a wind turbine according to an embodiment of the present invention. The nacelle 3 harbours a rotor 6 having a hub 7 at which plural rotor blades 8 are mounted.

In FIG. 1 the wind turbine 1 is in a first state, wherein the nacelle 3 is in a first orientation which is an upwind orientation. In the first orientation of the nacelle 3 illustrated in FIG. 1, the hub 7 faces the wind 9 and the hub 7 as well as the rotor blades 8 are upwind relative to the wind turbine tower 2. Thus, the rotor blades 8 and the hub 7 are in Luv relative to the tower 2.

FIG. 2 illustrates the wind turbine 1 in a second state which is adopted during a high wind load situation, for example during a heavy storm. In the second state, the nacelle 3 is in a second orientation being a downwind orientation. In the downwind orientation illustrated in FIG. 2, the rotor blades 8 and the hub 7 are downwind relative to the wind turbine tower 2, i.e., they are in Lee relative to the tower 2.

In order to transition the wind turbine 1 from the first state depicted in FIG. 1 to the second state depicted in FIG. 2, a method of handling the wind turbine according to an embodiment of the present invention is performed and carried out or controlled by the arrangement 5. Thereby, the arrangement 5 supplies a control signal 10 to the yawing actuator 4, while the wind turbine is in the first orientation as depicted in FIG. 1. Upon receiving the control signal 10, the yawing actuator 4 exerts a torque 11 depicted in FIG. 1 to the nacelle 3 (wherein the torque 11 is around a longitudinal axis 12 of the tower 2). By exerting the torque 11, the actuator 4 turns the nacelle 3 to a second orientation as is depicted in FIG. 2.

In FIG. 2 the second orientation corresponds to a nacelle orientation of 180° in which the rotor axis 13 of the rotor 6 is parallel to the wind direction 9 and the rotor blade hub is opposite to facing the wind 9, i.e., the rotor blades 8 are downwind relative to the wind turbine tower 2. The second orientation may not necessarily be exactly a nacelle orientation of 180°, but may deviate from the nacelle orientation of 180° within a particular angle tolerance range.

In the embodiment illustrated in FIG. 1 the wind turbine comprises one or more wind direction sensors 14*a,b* which may be mounted on top of the nacelle 3. In other embodiments wind direction sensors may be located elsewhere than depicted and/or wind direction information may be received from an external source. The wind direction sensors 14*a,b* acquire wind direction information 15 and supply it to the arrangement 5. The arrangement 5 considers the wind direction information 15 in embodiments of the present invention for turning the nacelle 3 and then maintaining the nacelle 3 at a particular second orientation as defined relative to the wind direction 9 as measured by the wind direction sensor 14.

From the inside of the nacelle 3 a power cable 16 runs inside the tower 2 to a foundation or to a not in detail illustrated outlet. Embodiments of the present invention monitor a cable twist of the cable 16 and turn in a direction to cause least cable twist when transitioning from the first state depicted in FIG. 1 to the second state in FIG. 2 or vice versa.

After the storm of heavy wind situation is over, the wind turbine 1 may then be turned from the second orientation or second state as depicted in FIG. 2 to a third state which might be similar to the first state as depicted in FIG. 1.

The FIG. 1 thereby illustrates a starting point for performing a method of handling the wind turbine wherein the wind turbine 1 may be idling at the upwind position with an active yaw control running. The wind speed in FIG. 1 may for example range between 25 to 40 m/s and the wind turbine may follow potentially wind direction change at the upwind position.

Then, the control functionality for placing the wind turbine in the downwind position is activated. This may happen either manually from a turbine control centre or automatically based on for example measured or estimated wind speeds, for example measured with one of the wind speed sensors 14*a*, 14*b*. Starting from the situation as depicted in FIG. 1, the wind turbine 1 may then start to yaw from the upwind position or orientation to the downwind position or orientation (considered as orientation of the nacelle). Thereby, the yawing direction may be in the direction which results in the smallest amount of cable twist (for example of cable 16) when the target position or orientation is reached, in order to place the wind turbine in the best position with respect to cable twist and minimize the risk of exceeding the twisting range of the cable during the the extreme wind conditions (hurricanes, typhoons, tropical cyclones may normally entail a significant wind direction change).

The transition to the downwind position or orientation may be performed by commanding the turbine to yaw to a 180° offset from the current wind direction or nacelle position. In both cases, the signal from the wind direction sensors may be used during the yawing to update the distance in angle degrees remaining to the target downwind position, based on changes in wind direction. However, the latter method also allows for yawing without relying on the wind direction/sensors. This may be an advantage if there is only one available wind direction sensor and the direction of yawing (for cable untwist) will cause that sensor to become blocked by the nacelle or other structures thereon at some point. Because it is possible to shift between using the wind direction and nacelle position approaches during the transition to the downwind position, when the wind direction sensor becomes unblocked, due to either the turbine yawing out of the blocked sensor or to the wind direction changing, the remaining distance and direction to the target downwind position can be updated.

In the downwind position orientation as depicted in FIG. 2, the wind turbine may follow a potential wind direction change by activating the yaw system 4. The capacity of the yaw system 4 may be reduced or be smaller compared to the upwind situation, because the turbine may yaw "with the wind" and not "against the wind" as for the upwind position or orientation. Additionally, the power consumption of the yawing system may be smaller which is especially important if the electrical power is provided by a power back-up system. The wind may be tracked by maintaining a 180° offset within a specified dead band for maintaining the downwind orientation as depicted in FIG. 2. The turbine's yaw controller may monitor the wind direction and may yaw the turbine back towards the offset when the difference between the 180° offset from the wind position or direction and the nacelle orientation exceeds the dead band (also referred to as tolerance angle range). A stop limit may determine how close the nacelle must come to the 180° offset before it can stop yawing. The wind direction may be filtered to limit the amount of yaw activity, wherein the filter time constant may be dependent on the wind speed.

The control functionality for bringing the turbine to the upwind position again (for power production) can be activated either manually from the turbine control centre or automatically based on a measured or estimated wind speed (normally around maximum startup wind speed between for example 20-25 m/s). Thereby, a (e.g., predefined) delay may be applied to avoid prematurely yawing upwind during an eye of storm or temporary lull in the storm.

Starting or continuing from the state as depicted in FIG. 2, the wind turbine may then start to yaw from the downwind orientation to the upwind orientation. The yawing direction may be the direction which results in the smallest amount of table twist when the target position is reached or target orientation is reached, in order to place the turbine in the base position with respect to cable twist and minimize the probability for a cable untwist during power production.

To yaw the wind turbine from the second state depicted in FIG. 2 to the third state which may be similar to the state as depicted in FIG. 1, the method may proceed in a similar or same manner as has been described for the position between the first state and the second state.

Again, in the upwind orientation the turbine may either idle or initiate a startup.

The power supply for the wind turbine may during the execution of the method, be provided from a grid connection or alternately from a power backup system, for example batteries or diesel generator if available.

FIG. 3 illustrates a method scheme 20 according to an embodiment of the present invention. In embodiments, the method 20 starts in a method step 21 by idling at an upwind orientation, while an active yaw control is executed. In a step 22, downwind idling is activated, either manually or by automatic activation. In a further method step 23, a transition to the downwind orientation or position is performed, wherein the wind turbine is turned or yawed to a downwind position or orientation. In a further method step 24, the wind turbine is idling at the downwind orientation, while the yaw control is active. In a further method step 25, the downwind idling is deactivated, either by manual or automatic deactivation.

In a further method step 26, a transition to an upwind position or orientation is performed, wherein the wind turbine is turned or yawed to the upwind position or orientation. In a further method 27 the wind turbine is idling at the upwind orientation or position or is starting up. Thereby, active yaw control may be performed.

For one or more of the method steps 21 to 27, power may be taken from a generically illustrated power supply 30, which may involve a power from the grid connection and/or a power from a backup system.

Embodiments of the present invention may allow the loading on the yawing system to be reduced in very extreme wind conditions, for example hurricanes, typhoons, and tropical cyclones. The load reduction of the yawing system may be achieved by placing the turbine in the downwind position or orientation, where the turbine would naturally end if it was completely free to rotate in the yawing system. Furthermore, energy consumption may be reduced.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of handling a wind turbine comprising a nacelle coupled via a yawing system to a tower, the method comprising:
   supplying a control signal to a yawing actuator of the yawing system, while the nacelle is in a first orientation; and
   exerting, by the yawing actuator, a torque to the nacelle relative to the tower, thereby turning the nacelle to a second orientation being a downwind orientation,
   wherein the second orientation is defined with respect to an actual wind direction measured by one or more wind direction sensors or with respect to the first orientation,
   wherein a definition of the second orientation is switched during the turning of the nacelle as a result of the torque exerted by the yawing actuator, depending on an availability of a wind direction signal provided by the one or more wind direction sensors.

2. The method according to claim 1,
   wherein in the downwind orientation a rotor blade hub at which a plurality of rotor blades are mounted is opposite to facing a wind direction and an angle between a rotor axis and the wind direction is within a tolerance angle range, being in between 0° and 20°,
      wherein at a nacelle orientation of 180° the wind direction is parallel to the rotor axis and the rotor blade hub is opposite to facing the wind direction.

3. The method according to claim 1,
   wherein the first orientation is an upwind orientation; and/or
   wherein active yaw control is performed when in first orientation and the second orientation.

4. The method according to claim 3,
   wherein in the upwind orientation a rotor blade hub at which a plurality of rotor blades are mounted faces a wind direction and an angle between a rotor axis and the wind direction is within a tolerance angle range, being between 0° and 20,
   wherein at a nacelle orientation of 0° the wind direction is parallel to the rotor axis and the rotor blade hub faces the wind direction.

5. The method according to claim 1,
   commanding the yaw actuator to turn the nacelle by 180° starting from the first orientation to reach the second orientation, without considering wind direction information.

6. The method according to claim 1, further comprising providing wind direction information by at least one of:
   monitoring a wind direction while turning the nacelle and/or while in the second orientation and/or while in the first orientation; and
   filtering the monitored wind direction, wherein a filter time constant depends on a wind speed.

7. The method according to claim 1,
   wherein the one or more wind direction sensors includes at least a first wind direction sensor and a second wind direction sensor mounted at different locations at the wind turbine and/or located externally to the wind turbine are used, whose measurement signals and/or state information are considered in combination and/or in a weighted manner for providing the wind direction information.

8. The method according to claim 1, further comprising, when the second orientation is reached and/or while turning the nacelle:
   supplying control signals to the yaw actuator to maintain nacelle orientation in a tolerance angle range measured from 180° when the monitored wind direction changes.

9. The method according to claim 8, further comprising, if nacelle orientation is outside the tolerance angle range:
   controlling the yaw actuator to exert a torque on the nacelle to turn the nacelle such that the nacelle orientation is readjusted to be within tolerance angle range; and
   stopping exerting the torque when a predetermined stop orientation within the tolerance angle range is reached.

10. The method according to claim 1,
    wherein turning the nacelle starting from the first orientation is in a turning direction to cause smallest amount of cable twist when the second orientation is reached.

11. The method according to claim 1, further comprising:
    exerting, by the yawing actuator, a torque to the nacelle relative to the tower, thereby
    turning the nacelle from the second orientation to a third orientation being an upwind orientation,
    wherein the third orientation is reached when the nacelle is turned by 180° starting from the second orientation and/or when the nacelle orientation is in a tolerance angle range measured from 0°.

12. The method according to claim 1,
    wherein turning the nacelle starting from the second orientation is in a turning direction to cause a smallest amount of cable twist when the third orientation is reached,
    wherein the method is performed and/or triggered and/or activated and/or the nacelle is turned from the second orientation to the third orientation automatically based on a measured and/or estimated wind speed, and/or
    wherein a delay is applied to avoid prematurely yawing upwind during an eye of storm or temporary lull in the storm.

13. The method according to claim 1,
wherein for actuating the yaw actuator electric energy is received from at least one of:
a utility grid;
a power backup system;
one or more batteries;
a combustion engine driven generator; and/or
wherein the method is performed or triggered and/or activated or the nacelle is turned to the second orientation,
when a high wind load that include a wind speed above a speed threshold, is expected and/or predicted and/or detected.

14. An arrangement for handling a wind turbine comprising a nacelle coupled via a yawing system to a tower for protection against high wind load, the arrangement comprising:
a control signal generator configured:
to supply a control signal to a yawing actuator of the yawing system, while the nacelle is in a first orientation;
to cause the yawing actuator to exert a torque to the nacelle relative to the tower, thereby turning the nacelle to a second orientation being a downwind orientation,
wherein the second orientation is defined with respect to an actual wind direction measured by one or more wind direction sensors or with respect to the first orientation,
wherein a definition of the second orientation is switched during the turning of the nacelle as a result of the torque exerted by the yawing actuator, depending on an availability of a wind direction signals from the one or more wind direction sensors.

15. A wind turbine, including:
a tower;
a nacelle on top of the tower coupled to the tower via a yawing system including a yawing actuator; and
an arrangement according to claim 14 communicatively coupled to the yawing actuator.

* * * * *